United States Patent
Komatsu et al.

(10) Patent No.: US 10,240,223 B2
(45) Date of Patent: Mar. 26, 2019

(54) NI-BASED ALLOY HAVING EXCELLENT HIGH-TEMPERATURE CREEP CHARACTERISTICS, AND GAS TURBINE MEMBER USING THE SAME

(71) Applicant: Hitachi Metals, Ltd., Tokyo (JP)

(72) Inventors: Akihiro Komatsu, Okegawa (JP); Katsuo Sugahara, Okegawa (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/546,103

(22) PCT Filed: Jan. 13, 2016

(86) PCT No.: PCT/JP2016/050780
§ 371 (c)(1),
(2) Date: Jul. 25, 2017

(87) PCT Pub. No.: WO2016/121495
PCT Pub. Date: Aug. 4, 2016

(65) Prior Publication Data
US 2018/0002784 A1     Jan. 4, 2018

(30) Foreign Application Priority Data
Jan. 26, 2015  (JP) .................................. 2015-012359

(51) Int. Cl.
C22C 19/05  (2006.01)
F01D 5/28  (2006.01)
F01D 25/00  (2006.01)
F02C 7/00  (2006.01)
C22F 1/10  (2006.01)
F01D 9/02  (2006.01)

(52) U.S. Cl.
CPC ............ C22C 19/056 (2013.01); C22C 19/05 (2013.01); C22F 1/10 (2013.01); F01D 5/28 (2013.01); F01D 25/00 (2013.01); F02C 7/00 (2013.01); F01D 9/02 (2013.01); F05D 2220/32 (2013.01); F05D 2300/177 (2013.01)

(58) Field of Classification Search
CPC .................................................... C22C 19/056
See application file for complete search history.

(56) References Cited

U.S. PATENT DOCUMENTS

| | | | |
|---|---|---|---|
| 2003/0164213 A1* | 9/2003 | Ueta | ...................... C22C 19/055 148/677 |
| 2008/0089803 A1 | 4/2008 | Okada et al. | |

FOREIGN PATENT DOCUMENTS

| | | |
|---|---|---|
| CN | 101151394 | 3/2008 |
| JP | S50-035023 | 4/1975 |
| JP | 07-216482 | 8/1995 |
| JP | 07-286503 | 10/1995 |
| JP | 2007-146296 | 6/2007 |

OTHER PUBLICATIONS

National Standard of the People's Republic of China "Types of Heat-Resisting Superalloys" GB/T 14992-94 and partial English translation (15 pages) (1994).
Office Action issued in connection with Chinese Patent Application No. 201680007354.6 (13 pages) (dated Apr. 18, 2018).
International Search Report corresponding to International Patent Application No. PCT/JP2016/050780 (1 page) (dated Apr. 19, 2016).

* cited by examiner

*Primary Examiner* — Jessee R Roe
(74) *Attorney, Agent, or Firm* — Myers Bigel, P.A.

(57) ABSTRACT

Provided is a Ni-based alloy having a composition consisting of, by mass %, Cr: 14.0% to 17.0% (preferably, not less than 14.0% and less than 15.0%), Fe: 5.0% to 9.0%, Ti: 2.2% to 2.8%, Al: 0.40% to 1.00%, a total amount of Nb+Ta: 0.7% to 1.2%, B: 0.001% to 0.010%, Zr: 0.01% to 0.15%, Mg: 0.001% to 0.050%, Mn: 0.01% to 0.20%, Cu: 0.005% to 0.300%, Mo: 0.01% to 0.30%, C: 0.01% to 0.05%, and the balance of Ni with inevitable impurities. In a creep test under conditions of a test temperature of 750° C. and a test load of 330 MPa, the Ni-based alloy preferably has a creep rupture life of not less than 120 hours and an elongation of not less than 16%, i.e., has good high-temperature creep characteristics. The Ni-based alloy is suitable for a gas turbine member.

5 Claims, No Drawings

NI-BASED ALLOY HAVING EXCELLENT HIGH-TEMPERATURE CREEP CHARACTERISTICS, AND GAS TURBINE MEMBER USING THE SAME

TECHNICAL FIELD

The present invention relates to a Ni-based alloy having excellent high-temperature creep characteristics and a gas turbine member using this Ni-based alloy and, more particularly, to a Ni-based alloy having a long creep rupture time and large rupture elongation, and a gas turbine member using the alloy.

BACKGROUND ART

A Ni-based alloy is used in various fields because it has a high strength, high toughness, high corrosion resistance, and high heat resistance. One field using the Ni-based alloy is a natural gas fired power station which generates electric power by rotating a turbine by using a high-temperature gas generated by burning fuel or the like. The Ni-based alloy is used as a gas turbine member for use in this power station. Since the gas turbine member is placed in an environment to be exposed to a high-temperature high-pressure gas, constituent materials (e.g., a burner, stationary blade, moving blade, and transition piece) of the member are required to have a high heat resistance (e.g., a high-temperature strength and oxidation resistance) and a high toughness at a high temperature.

As a material having these characteristics, an age hardened Ni-based alloy defined by NCF750/751 of the JIS standard (JIS G 4902), containing, by mass, Cr: 14% to 17%, Fe: 5% to 9%, Ti: 2.25% to 2.75%, Al: 0.4% to 1%, and Nb+Ta: 0.7% to 1.2%, and also containing Ni and inevitable impurities as the balance is known. This Ni-based alloy is adopted as a gas turbine member having a high high-temperature oxidation resistance.

In contrast, as a material having a strength and high-temperature corrosion resistance higher than those of the above-mentioned NCF751, Patent Document 1 has proposed an Ni-based alloy for exhaust valves of an automobile engine and marine engine, which is an Ni-based alloy as an exhaust valve material or the like, contains, by mass, one or two elements selected from C: 0.01% to 0.20%, Si: 2% or less, Mn: 2% or less, Cr: 15% to 25%, Mo+1/2 W: 0.5% to 3.0%, Nb+Ta: 0.3% to 3.0%, Ti: 1.5% to 3.5%, Al: 0.5% to 2.5%, Fe: 5% to 15%, Zr: 0.01% to 0.10%, B: 0.0010% to 0.02%, Ca: 0.001% to 0.03%, and Mg: 0.001% to 0.03%, contains, in at %, Al+Ti+Nb+Ta=6.0% to 7.0%, and also contains Ni as the balance.

The constituent materials of the gas turbine are required to have different characteristics in accordance with portions where they are used. Therefore, Patent Document 2 has proposed a method of using Ni-based alloys in accordance with portions where they are used, in a power generating gas turbine including a compressor, a burner, and three or more stages of turbine blades and turbine nozzles fixed to a turbine disk.

For example, Patent Document 2 has disclosed a method in which (1) a first-stage turbine blade is made of a single-crystal cast of an Ni-based alloy, and turbine blades and turbine nozzles of the second and subsequent stages are made of casts of the Ni-based alloy, (2) a first-stage turbine blade is made of a single-crystal cast of a Ni-based alloy, a first-stage turbine nozzle is made of a Ni-based alloy unidirectionally solidified cast having a heat-shielding coating layer, and turbine blades and turbine nozzles of the second and subsequent stages are made of casts of the Ni-based alloy, (3) a first-stage turbine blade and first-stage turbine nozzle are made of a single-crystal cast of a Ni-based alloy, and turbine blades and turbine nozzles of the second and subsequent stages are made of casts of the Ni-based alloy, (4) a first-stage turbine blade is made of a Ni-based alloy unidirectionally solidified cast having a heat-shielding coating layer, and turbine blades and turbine nozzles of the second and subsequent stages are made of casts of the Ni-based alloy, and (5) a first-stage turbine blade and first-stage turbine nozzle are made of a Ni-based alloy unidirectionally solidified cast having a heat-shielding coating layer, and turbine blades and turbine nozzles of the second and subsequent stages are made of casts of the Ni-based alloy.

As the Ni-based alloy cast for use in the turbine blades of the second and subsequent stages, Patent Document 2 takes, as an example, a Ni-based alloy containing, by mass, Cr: 12% to 16%, Mo: 0.5% to 2%, W: 2% to 5%, Al: 2.5% to 5%, Ti: 3% to 5%, Ta: 1.5% to 3%, Co: 8% to 10%, C: 0.05% to 0.15%, and B: 0.005% to 0.02%. As the Ni-based alloy cast for use in the turbine nozzles of the second and subsequent stages, Patent Document 2 takes, as an example, a Ni-based alloy containing, by mass, Cr: 21% to 24%, Co: 18% to 23%, C: 0.05% to 0.20%, W: 1% to 8%, Al: 1% to 2%, Ti: 2% to 3%, Ta: 0.5% to 1.5%, and B: 0.05% to 0.15%.

Furthermore, Patent Document 3 has proposed a method of improving the creep characteristics by performing a heat treatment at a temperature of 1,650° F. to 1,850° F. for 0.5 to 2.0 hours when thermally treating a gas turbine member containing, by mass, Cr: 14.5% to 17.0%, Co: 12.0% to 15.0%, Mo: 2.50% to 5.05%, W: 0.5% to 1.5%, Ti: 4.0% to 5.5%, Al: 2.0% to 2.4%, Zr: 0.02% to 0.12%, C: 0.005% to 0.040%, B: 0.003% to 0.020%, and Mg: 0.001% to 0.005%, and also containing Ni as the balance.

CITATION LIST

Patent Document

Patent Document 1: JP H07-216482 A
Patent Document 2: JP H07-286503 A
Patent Document 3: JP 2007-146296 A

SUMMARY OF INVENTION

Technical Problem

In a power generating turbine, the rise of an inlet temperature improves the power generation efficiency. Therefore, research has been made in various fields for the purpose of raising the gas turbine inlet temperature. Accordingly, large demands have arisen for research and development of a heat-resistant member having a high heat resistance, particularly, a high high-temperature strength.

Recently, a combined gas turbine combining a fuel engine and steam engine has been developed in order to reduce the $CO_2$ emission amount. Since raising the temperature of a gas turbine member improves the power generation efficiency in this combined gas turbine as well, demands greater than those before have arisen for the research and development of a heat-resistant member.

To improve the power generation efficiency, a technique capable of thinning a gas turbine member is particularly essential to improve the thermal conductivity. For this purpose, however, it is necessary to improve the high-temperature characteristic per unit area of the gas turbine member.

A material particularly excellent in creep rupture characteristic as the high-temperature characteristic has been required. More specifically, when a predetermined stress is applied at a high temperature, the rupture life (time) before creep rupture is required to be long, and a predetermined elongation or more is required to prevent brittle fracture by which rupture occurs at once. A material preferably has an elongation of 10% to 30% for the same creep rupture life.

Unfortunately, NCF750 defined in the aforementioned JIS standard (JIS G 4902) has a low creep rupture strength. Also, in the above-mentioned NCF751, a γ' phase which increases the age hardening property is increased by increasing the Al content, but this decreases the creep rupture strength.

In addition, in the Ni-based alloy disclosed in Patent Document 1, the generation amount of the γ' phase is increased by increasing the Ti and Al contents, but the creep rupture strength is not high. Furthermore, the Ni-based alloys described in PTLs 2 and 3 have neither a high creep rupture strength nor a large rupture elongation.

Solution to Problem

Accordingly, the present inventors have extensively investigated in order to solve these problems and obtain a Ni-based alloy superior to conventional Ni-based alloys in high-temperature creep characteristics, particularly, a creep rupture time and high-temperature elongation. Consequently, the present inventors have found that a Ni-based alloy having a composition including, by mass, Cr: 14.0% to 17.0%, Fe: 5.0% to 9.0%, Ti: 2.2% to 2.8%, Al: 0.40% to 1.00%, Nb+Ta: 0.7% to 1.2%, B: 0.001% to 0.010%, Zr: 0.01% to 0.15%, Mg: 0.001% to 0.050%, Mn: 0.01% to 0.20%, Cu: 0.005% to 0.300%, Mo: 0.01% to 0.30%, C: 0.01% to 0.05%, and the balance of Ni with inevitable impurities is superior to conventional Ni-based alloys in high-temperature creep characteristics, i.e., this Ni-based alloy has a long high-temperature creep rupture life (time), i.e., a long useful life, and a large high-temperature rupture elongation.

The present invention has been made based on the above-described findings and is as follows.

(1) A Ni-based alloy having a composition consisting of, by mass, Cr: 14.0% to 17.0%, Fe: 5.0% to 9.0%, Ti: 2.2% to 2.8%, Al: 0.40% to 1.00%, a total amount of Nb+Ta: 0.7% to 1.2%, B: 0.001% to 0.010%, Zr: 0.01% to 0.15%, Mg: 0.001% to 0.050%, Mn: 0.01% to 0.20% Cu: 0.005% to 0.300%, Mo: 0.01% to 0.30%, C: 0.01% to 0.05%, and the balance of Ni with inevitable impurities.

(2) The Ni-based alloy according to (1), wherein a total content of B, Zr, Cu, and Mo is from 0.18% to 0.51%.

(3) The Ni-based alloy according to (1) or (2), wherein the content of Cr is not less than 14.0% and less than 15.0%.

(4) The Ni-based alloy according to any one of (1) to (3), wherein in a creep test under condition of a test temperature of 750° C. and a test load of 330 MPa, the Ni-based alloy has a creep rupture life of at least 120 hours and an elongation of at least 16%.

(5) A gas turbine member including the Ni-based alloy according to any one of items (1) to (4).

Advantageous Effects of Invention

The Ni-based alloy of the present invention has a long high-temperature creep rupture life and a large high-temperature elongation, i.e., has excellent characteristics because the contents of alloy component elements are determined as described above. Therefore, this Ni-based alloy has high-temperature creep characteristics better than those of conventional Ni-based alloys. Also, when a gas turbine member is formed by using the Ni-based alloy of the present invention, the member has good creep characteristics under high-temperature conditions. This makes it possible to decrease the thickness of the member, and raise the gas turbine inlet temperature. Consequently, it is possible to achieve excellent industrial effects, e.g., improve the power generation efficiency.

DESCRIPTION OF EMBODIMENTS

Next, the reasons why the composition ranges of the individual component elements of the Ni-based alloy of the present invention are limited will be described in detail below.

Cr:

Cr is an element which improves the high-temperature strength, and is an element which promotes passivation of the Ni-based alloy, thereby achieving a high oxidation resistance against an oxidizing environment. If the Cr content is less than 14.0% by mass ("% by mass" will simply be indicated by "%" hereinafter), it is impossible to sufficiently improve the high-temperature strength and oxidation resistance. In contrast, if the Cr content exceeds 17.0%, the alloy reacts with oxygen or carbon, a nonmetallic inclusions easily form, and the hot workability deteriorates. To secure the high-temperature strength and hot workability, therefore, Cr content is set at 14.0% to 17.0%. To further improve the hot workability, the upper limit of Cr is preferably 15.0%.

Fe:

Fe has an effect of improving the hot workability. However, when the Fe content is less than 5.0%, this hot workability improving effect cannot be obtained. On the other hand, when the Fe content exceeds 9.0%, the high-temperature strength decreases. Accordingly, the Fe content is set at 5.0% to 9.0%. The lower limit of Fe is preferably 8.0%. The upper limit of Fe is preferably 9.0%.

Ti:

Ti is an element necessary to precipitate the γ' phase which improves the high-temperature strength of the Ni-based alloy. However, when the Ti content is less than 2.2%, no stable γ' phase precipitation occurs, so it is impossible to ensure a sufficient creep rupture life of the Ni-based alloy. On the other hand, when the Ti content exceeds 2.8%, the creep characteristics deteriorate. That is, excess Ti addition unnecessarily increases the volume fraction of the γ' phase, and as a consequence the creep rupture life decreases. Therefore, the Ti content is set at 2.2% to 2.8%. The lower limit of Ti is preferably 2.5%. The upper limit of Ti is preferably 2.7%.

Al:

In the same manner as Ti, Al is a typical element which precipitates the γ' phase which improves the strength of the Ni-based alloy. When the Al content is less than 0.40%, no stable γ' phase precipitation occurs, so it is impossible to ensure a creep rupture life of the Ni-based alloy. On the other hand, when the Al content exceeds 1.00%, the creep rupture life decreases. Therefore, the Al content is set at 0.40% to 1.00%. The lower limit of Al is preferably 0.60%. The upper limit of Al is preferably 0.90%.

Nb+Ta:

Nb and Ta have an effect of precipitating the γ' phase which improves the strength of the Ni-based alloy. Since Ta and Nb have the same effect, the contents of Nb and Ta are determined as a total amount of Nb+Ta: 0.7% to 1.2%. Note that Nb+Ta means one or both of Nb and Ta, so Nb or Ta can be used alone. When the total amount of Nb+Ta is less than 0.7%, no stable γ' phase precipitation occurs, so it is impossible to ensure a creep rupture life of the Ni-based alloy. On the other hand, when the total amount of Nb+Ta exceeds 1.2%, the creep rupture elongation decreases. Therefore, the total amount of Nb and Ta is set at 0.7% to 1.2%. The lower limit of the total amount of Nb+Ta is preferably 0.9%. The upper limit of the total amount of Nb+Ta is preferably 1.1%.

B:

B has an effect of increasing the creep strength of the Ni-based alloy by thickening in the grain boundary, thereby prolonging the creep rupture life as a consequence. Especially when B and Zr are contained at the same time, this effect is achieved far more remarkably than when using B alone. The creep strength improving effect is achieved when the B content is 0.001% or more, but excess addition exceeding 0.010% decreases the creep strength. Therefore, the B content is set at 0.001% to 0.010%. The lower limit of B is preferably 0.002%. The upper limit of B is preferably 0.007%.

Zr:

In the same manner as B, Zr has the effect of increasing the creep strength of the Ni-based alloy by thickening in the grain boundary, thereby prolonging the creep rupture life as a consequence. The creep strength improving effect is achieved when the Zr content is 0.01% or more, but excess addition by which the Zr content exceeds 0.15% decreases the creep strength. Therefore, the Zr content is set at 0.01% to 0.15%. The lower limit of Zr is preferably 0.06%. The upper limit of Zr is preferably 0.14%.

Mg:

Mg achieves a desulfurizing effect when melted, and at the same time achieves a hot workability improving effect. When the Mg content is less than 0.001%, the desulfurizing effect decreases, and a sulfur compound having a low melting point is concentrated in the grain boundary. As a consequence, the creep rupture life significantly decreases. On the other hand, when the Mg content exceeds 0.050%, the hot workability decreases. Accordingly, the Mg content is set at 0.001% to 0.050%. The lower limit of Mg is preferably 0.010%. The upper limit of Mg is preferably 0.040%.

Mn:

Mn has an effect of stabilizing an austenite phase as a parent phase, and as a consequence improves the hot workability. However, this effect cannot be obtained when the Mn content is less than 0.01%. On the other hand, the creep rupture life shortens when the Mn content exceeds 0.20%. Accordingly, the Mn content is set at 0.01% to 0.20%. The lower limit of Mn is preferably 0.02%. The upper limit of Mn is preferably 0.10%.

Cu:

Cu is an element which forms a solid solution with Ni at a freely selected ratio. When the addition amount is appropriate, Cu contributes to improving ductility, and as a consequence achieves an effect of increasing the creep rupture elongation. However, when the Cu content is less than 0.005%, no creep rupture elongation increasing effect is obtained. On the other hand, when the Cu content exceeds 0.300%, the creep strength decreases. Therefore, the Cu content is set at 0.005% to 0.300%. The lower limit of Cu is preferably 0.008%. The upper limit of Cu is preferably 0.020%.

Mo:

Mo has an effect of strengthening the austenite phase by solute strengthening and increasing the creep strength as a consequence, thereby achieving an effect of prolonging the creep rupture life. When the Mo content is 0.01% or more, the creep rupture life prolonging effect notably appears. However, the creep rupture elongation decreases when the Mo content exceeds 0.30%. Therefore, the Mo content is set at 0.01% to 0.30%. The lower limit of Mo is preferably 0.08%. The upper limit of Mo is preferably 0.20%.

C:

C has an effect of improving the creep strength by precipitating Cr carbide, thereby prolonging the creep rupture life as a consequence. This effect appears when the C content is 0.01% or more. When the C content exceeds 0.05%, however, the ratio of the carbide in the grain boundary exceeds the limit, and the creep rupture life decreases. Accordingly, the C content is set at 0.01% to 0.05%. The lower limit of C is preferably 0.02%. The upper limit of C is preferably 0.04%.

The range of each component of the composition of the Ni-based alloy of the present invention is as described above. Far better high-temperature creep characteristics can be obtained when the contents of B, Zr, Cu, and Mo of the alloy composition of the present invention are respectively maintained within ranges of 0.001% to 0.010%, 0.01% to 0.15%, 0.005% to 0.300%, and 0.01% to 0.30%, respectively, and the total content of these components (i.e., B+Zr+Cu+Mo) is maintained within a range from 0.18% to 0.51%, and preferably, a range from 0.24% to 0.50%.

As will be shown in Table 1 of examples described later, the Ni-based alloy of the present invention has a high-temperature creep rupture life of at least 100 hours and an elongation of 10% to 30%, i.e., has good high-temperature creep characteristics. When, for example, the total content of B, Zr, Cu, and Mo (i.e., B+Zr+Cu+Mo) is maintained within a range from 0.18% to 0.51% (see Ni-based alloys 1 to 27 of the present invention in Table 1 of the examples described later), the Ni-based alloy achieves far better high-temperature creep characteristics, i.e., has a high-temperature creep rupture life of at least 120 hours and an elongation of at least 16%.

Furthermore, by selecting the composition ranges defined by the present invention, it is possible to obtain far better high-temperature creep characteristics, i.e., a high-temperature creep rupture life of at least 150 hours and an elongation of at least 20% (see the Ni-based alloys of examples 1, 2, 4 to 8, 10, 12, 14, 15, 17, 18, and 25 to 27 of the present invention in Table 1 described later).

In any case, the Ni-based alloy of the present invention has the high-temperature creep characteristics that the high-temperature creep rupture time is at least 100 hours and the elongation is at least 10%. By appropriately determining the composition ranges, however, it is possible to obtain excellent high-temperature creep characteristics suitable for a gas turbine member or the like, i.e., a high-temperature creep rupture life of at least 120 hours and an elongation of at least 16%, or a high-temperature creep rupture life of at least 150 hours and an elongation of at least 20%.

Inevitable impurities:

In addition to the above-mentioned elements with the determined content ranges in the alloy composition, the alloy composition of the present invention may include elements as impurity components, e.g., Si, Co, S, and P, which are inevitably mixed and contained in melted materials or during alloy manufacturing processes. When the total content of these elements as inevitable impurity components is less than 1%, they exert no large influence on the characteristics of the Ni-based alloy of the present invention. In the present invention, therefore, these elements as inevitable impurity components are allowable when the total content is less than 1%. Even in this case, the content of each of S and P is desirably less than 0.01%.

EXAMPLES

Examples of the present invention will be explained below.

Manufacture of Ni-based alloy:

First, the Ni-based alloy of the present invention was manufacturing following the procedures below.

(a) First, materials so blended as to have predetermined compositions shown in Table 1 were melted by using a high-frequency vacuum melting furnace, thereby forming 6-kg ingots each having a diameter of 80 mm×a length of 150 mm of the present invention.

(b) Then, a homogenizing heat treatment was performed on the ingots of the present invention at 1,230° C. for 10 hours, and the ingots were cooled with water. After that, forging and hot rolling were performed within a range of 800° C. to 1,200° C., thereby manufacturing plates each having a width of about 200 mm×a length of about 750 mm×a thickness of 5 mm.

(c) Subsequently, a heat treatment was performed on the plates by using an electric heating furnace. More specifically, the plates were held at a solution treatment temperature of 1,150° C. for 4 hours, cooled with air, held at a stabilizing temperature of 850° C. for 24 hours, cooled with air, held at an aging temperature of 700° C. for 20 hours, and cooled with air, thereby manufacturing plates of the Ni-based alloys of examples 1 to 27 of the present invention shown in Table 1.

For comparison, materials so blended as to have compositions falling outside the composition ranges of the present invention and shown in Table 2 were melted by using the high-frequency vacuum melting furnace, thereby forming 6-kg ingots each having a diameter of 80 mm×a length of 150 mm of comparative examples. After that, plates were manufactured by performing the homogenizing heat treatment, forging, and hot rolling of item (b) above under the same conditions as those for the ingots of the present invention. In addition, the solution treatment, stabilizing treatment, and aging treatment of item (c) above were performed under the same conditions as those for the ingots of the present invention, thereby manufacturing plates of the Ni-based alloys of comparative examples 1 to 24 shown in Table 2. Note that when manufacturing the Ni-based alloys of comparative examples 2, 18, and 24, it was impossible to obtain robust plates because the ingots cracked during forging or hot rolling, so the solution treatment, stabilizing treatment, and aging treatment after that were canceled.

Furthermore, for reference, commercially available 500× 500×5 mm plates of NCF750/751 defined by JIS G 4902 were purchased (an aging treatment was already performed), and used as plates of the Ni-based alloys of conventional examples 1 to 4 shown in Table 3. Also, the Ni-based alloys having the compositions disclosed in Patent Document 1 were manufactured by the same method as the examples of the present invention, and used as plates of the Ni-based alloys of conventional examples 5 and 6 shown in Table 3.

Creep test:

Test pieces having a shape defined by ASTM E8 were cut out from the plates of the Ni-based alloys of examples 1 to 27 of the present invention, the Ni-based alloys of comparative examples 1 to 24 (except comparative examples 2, 18, and 24), and the Ni-based alloys of conventional examples 1 to 6 manufactured as described above, and creep tests were conducted under the conditions of a heating temperature of 750° C. with a stress of 330 MPa in accordance with a test method complying with ASTM E139. Tables 1 to 3 show the creep rupture elongation (%) and the rupture time (hrs) as a creep rupture life obtained in the creep test of the test pieces of these Ni-based alloys.

TABLE 1

| | | Cr mass % | Fe mass % | Ti mass % | Al mass % | Nb + Ta mass % | B mass % | Zr mass % | Mg mass % | Mn mass % | Cu mass % | Mo mass % | Cu + Mo + B + Zr mass % | C mass % | Ni mass % | Elongation % | Rupture time hrs | Note |
|---|---|---|---|---|---|---|---|---|---|---|---|---|---|---|---|---|---|---|
| Ni-based | 1 | 14.4 | 7.9 | 2.6 | 0.75 | 1.1 | 0.005 | 0.12 | 0.020 | 0.05 | 0.010 | 0.14 | 0.28 | 0.04 | bal. | 27 | 192 | |
| alloys of | 2 | 14.5 | 7.8 | 2.6 | 0.75 | 1.1 | 0.005 | 0.12 | 0.010 | 0.05 | 0.010 | 0.10 | 0.24 | 0.04 | bal. | 22 | 186 | |
| examples | 3 | 14.3 | 7.6 | 2.6 | 0.75 | 1.1 | 0.005 | 0.12 | 0.020 | 0.05 | 0.010 | 0.04 | 0.18 | 0.04 | bal. | 17 | 124 | |
| of present | 4 | 14.0 | 7.1 | 2.5 | 0.71 | 1.0 | 0.005 | 0.07 | 0.030 | 0.10 | 0.109 | 0.15 | 0.33 | 0.03 | bal. | 26 | 182 | |
| invention | 5 | 16.9 | 7.0 | 2.5 | 0.69 | 0.9 | 0.005 | 0.06 | 0.031 | 0.10 | 0.120 | 0.14 | 0.33 | 0.04 | bal. | 27 | 184 | |
| | 6 | 14.4 | 5.1 | 2.5 | 0.71 | 1.0 | 0.005 | 0.06 | 0.030 | 0.11 | 0.142 | 0.16 | 0.37 | 0.03 | bal. | 25 | 195 | |
| | 7 | 14.5 | 8.9 | 2.4 | 0.70 | 0.9 | 0.006 | 0.06 | 0.028 | 0.10 | 0.154 | 0.13 | 0.35 | 0.03 | bal. | 25 | 163 | |
| | 8 | 14.6 | 7.0 | 2.2 | 0.69 | 0.9 | 0.005 | 0.06 | 0.031 | 0.08 | 0.131 | 0.12 | 0.32 | 0.02 | bal. | 22 | 187 | |
| | 9 | 14.7 | 6.8 | 2.8 | 0.70 | 0.9 | 0.005 | 0.06 | 0.032 | 0.10 | 0.130 | 0.15 | 0.35 | 0.03 | bal. | 19 | 176 | |
| | 10 | 14.3 | 7.1 | 2.5 | 0.41 | 1.0 | 0.005 | 0.07 | 0.036 | 0.09 | 0.134 | 0.15 | 0.36 | 0.03 | bal. | 23 | 183 | |
| | 11 | 14.5 | 7.2 | 2.6 | 0.99 | 1.0 | 0.005 | 0.07 | 0.032 | 0.10 | 0.150 | 0.15 | 0.38 | 0.03 | bal. | 19 | 171 | |
| | 12 | 14.5 | 7.0 | 2.5 | 0.68 | 0.7 | 0.005 | 0.07 | 0.030 | 0.10 | 0.170 | 0.17 | 0.42 | 0.04 | bal. | 21 | 180 | |
| | 13 | 14.6 | 6.9 | 2.4 | 0.70 | 1.2 | 0.005 | 0.06 | 0.035 | 0.09 | 0.187 | 0.14 | 0.39 | 0.04 | bal. | 18 | 163 | |
| | 14 | 14.7 | 7.0 | 2.6 | 0.73 | 1.0 | 0.001 | 0.06 | 0.027 | 0.09 | 0.148 | 0.15 | 0.36 | 0.02 | bal. | 21 | 178 | |
| | 15 | 14.6 | 7.0 | 2.4 | 0.72 | 1.0 | 0.009 | 0.06 | 0.029 | 0.08 | 0.140 | 0.15 | 0.36 | 0.02 | bal. | 24 | 183 | |
| | 16 | 14.5 | 6.9 | 2.5 | 0.67 | 0.9 | 0.005 | 0.01 | 0.028 | 0.10 | 0.150 | 0.14 | 0.31 | 0.03 | bal. | 17 | 138 | |
| | 17 | 14.5 | 6.8 | 2.4 | 0.71 | 1.0 | 0.006 | 0.15 | 0.030 | 0.13 | 0.155 | 0.15 | 0.46 | 0.03 | bal. | 26 | 188 | |
| | 18 | 14.3 | 6.9 | 2.5 | 0.70 | 1.0 | 0.005 | 0.07 | 0.001 | 0.14 | 0.147 | 0.15 | 0.37 | 0.03 | bal. | 22 | 185 | |
| | 19 | 14.2 | 6.7 | 2.5 | 0.70 | 1.0 | 0.006 | 0.06 | 0.049 | 0.10 | 0.167 | 0.13 | 0.36 | 0.04 | bal. | 17 | 152 | |
| | 20 | 14.3 | 7.3 | 2.5 | 0.70 | 0.9 | 0.005 | 0.07 | 0.031 | 0.01 | 0.150 | 0.15 | 0.38 | 0.03 | bal. | 17 | 148 | |
| | 21 | 14.5 | 7.1 | 2.6 | 0.71 | 0.9 | 0.006 | 0.06 | 0.032 | 0.19 | 0.147 | 0.15 | 0.36 | 0.03 | bal. | 18 | 162 | |
| | 22 | 14.7 | 7.0 | 2.5 | 0.70 | 1.0 | 0.005 | 0.06 | 0.030 | 0.10 | 0.005 | 0.12 | 0.19 | 0.02 | bal. | 16 | 124 | |
| | 23 | 14.8 | 7.2 | 2.4 | 0.69 | 0.9 | 0.005 | 0.06 | 0.029 | 0.09 | 0.298 | 0.15 | 0.51 | 0.03 | bal. | 19 | 137 | |
| | 24 | 14.5 | 7.0 | 2.5 | 0.70 | 1.0 | 0.005 | 0.06 | 0.028 | 0.08 | 0.149 | 0.01 | 0.22 | 0.02 | bal. | 16 | 123 | |
| | 25 | 14.6 | 7.0 | 2.5 | 0.72 | 0.9 | 0.005 | 0.07 | 0.026 | 0.10 | 0.133 | 0.29 | 0.50 | 0.03 | bal. | 22 | 178 | |
| | 26 | 14.6 | 7.1 | 2.4 | 0.70 | 1.0 | 0.005 | 0.06 | 0.035 | 0.09 | 0.153 | 0.15 | 0.37 | 0.01 | bal. | 22 | 166 | |

TABLE 1-continued

| | | Cr mass % | Fe mass % | Ti mass % | Al mass % | Nb + Ta mass % | B mass % | Zr mass % | Mg mass % | Mn mass % | Cu mass % | Mo mass % | Cu + Mo + B + Zr mass % | C mass % | Ni mass % | Elongation % | Rupture time hrs | Note |
|---|---|---|---|---|---|---|---|---|---|---|---|---|---|---|---|---|---|---|
| | 27 | 14.5 | 7.0 | 2.5 | 0.70 | 1.0 | 0.005 | 0.06 | 0.030 | 0.10 | 0.146 | 0.18 | 0.39 | 0.05 | bal. | 25 | 190 | |
| | 28 | 14.8 | 6.9 | 2.5 | 0.67 | 1.0 | 0.007 | 0.13 | 0.024 | 0.10 | 0.204 | 0.21 | 0.55 | 0.05 | bal. | 15 | 119 | |
| | 29 | 14.4 | 7.0 | 2.6 | 0.68 | 1.0 | 0.005 | 0.05 | 0.027 | 0.08 | 0.014 | 0.08 | 0.15 | 0.05 | bal. | 12 | 102 | |

TABLE 2

| | | Cr mass % | Fe mass % | Ti mass % | Al mass % | Nb + Ta mass % | B mass % | Zr mass % | Mg mass % | Mn mass % |
|---|---|---|---|---|---|---|---|---|---|---|
| Ni-based alloys of comparative examples | 1 | 13.8* | 7.0 | 2.5 | 0.70 | 1.0 | 0.005 | 0.06 | 0.025 | 0.09 |
| | 2 | 17.3* | 6.9 | 2.4 | 0.70 | 1.0 | 0.005 | 0.06 | 0.026 | 0.10 |
| | 3 | 14.3 | 4.8* | 2.7 | 0.71 | 1.0 | 0.006 | 0.06 | 0.027 | 0.12 |
| | 4 | 14.5 | 9.4* | 2.5 | 0.69 | 0.8 | 0.005 | 0.06 | 0.023 | 0.09 |
| | 5 | 14.6 | 7.2 | 2.0* | 0.68 | 0.9 | 0.005 | 0.06 | 0.022 | 0.08 |
| | 6 | 14.7 | 7.0 | 2.9* | 0.70 | 1.0 | 0.004 | 0.06 | 0.024 | 0.10 |
| | 7 | 14.3 | 7.0 | 2.5 | 0.37* | 1.0 | 0.004 | 0.05 | 0.025 | 0.11 |
| | 8 | 14.5 | 7.2 | 2.5 | 1.02* | 1.0 | 0.004 | 0.03 | 0.025 | 0.10 |
| | 9 | 14.5 | 7.0 | 2.5 | 0.70 | 0.6* | 0.006 | 0.04 | 0.024 | 0.10 |
| | 10 | 14.5 | 6.9 | 2.4 | 0.70 | 1.3* | 0.005 | 0.05 | 0.026 | 0.11 |
| | 11 | 14.3 | 7.3 | 2.6 | 0.70 | 1.0 | —* | 0.06 | 0.025 | 0.11 |
| | 12 | 14.4 | 7.1 | 2.6 | 0.70 | 1.0 | 0.012* | 0.06 | 0.025 | 0.10 |
| | 13 | 14.3 | 7.0 | 2.7 | 0.71 | 0.8 | 0.005 | 0.005* | 0.025 | 0.09 |
| | 14 | 14.5 | 7.2 | 2.5 | 0.70 | 1.0 | 0.005 | 0.16* | 0.027 | 0.10 |
| | 15 | 14.7 | 7.0 | 2.5 | 0.71 | 1.0 | 0.005 | 0.06 | —* | 0.10 |
| | 16 | 14.5 | 6.7 | 2.5 | 0.70 | 0.9 | 0.005 | 0.06 | 0.053* | 0.08 |
| | 17 | 14.7 | 6.9 | 2.4 | 0.68 | 1.1 | 0.006 | 0.08 | 0.027 | —* |
| | 18 | 14.8 | 7.1 | 2.5 | 0.73 | 1.1 | 0.005 | 0.06 | 0.022 | 0.24* |
| | 19 | 14.4 | 7.2 | 2.5 | 0.71 | 1.0 | 0.005 | 0.06 | 0.022 | 0.10 |
| | 20 | 14.5 | 7.0 | 2.5 | 0.71 | 0.9 | 0.007 | 0.06 | 0.023 | 0.10 |
| | 21 | 14.5 | 7.0 | 2.4 | 0.70 | 1.0 | 0.005 | 0.07 | 0.026 | 0.11 |
| | 22 | 14.7 | 6.9 | 2.5 | 0.68 | 1.0 | 0.006 | 0.08 | 0.025 | 0.12 |
| | 23 | 14.5 | 7.0 | 2.5 | 0.70 | 1.0 | 0.005 | 0.06 | 0.025 | 0.10 |
| | 24 | 14.7 | 7.1 | 2.5 | 0.74 | 0.9 | 0.004 | 0.06 | 0.025 | 0.10 |

| | | Cu mass % | Mo mass % | Cu + Mo + B + Zr mass % | C mass % | Ni mass % | Elongation % | Rupture time hrs | Note |
|---|---|---|---|---|---|---|---|---|---|
| Ni-based alloys of comparative examples | 1 | 0.151 | 0.15 | 0.37 | 0.03 | bal. | 10 | 55 | |
| | 2 | 0.154 | 0.14 | 0.36 | 0.04 | bal. | No data | | Hot work crack |
| | 3 | 0.154 | 0.16 | 0.38 | 0.04 | bal. | 11 | 56 | |
| | 4 | 0.150 | 0.13 | 0.35 | 0.04 | bal. | 9 | 39 | |
| | 5 | 0.157 | 0.15 | 0.37 | 0.44 | bal. | 12 | 45 | |
| | 6 | 0.147 | 0.09 | 0.30 | 0.01 | bal. | 6 | 33 | |
| | 7 | 0.146 | 0.15 | 0.35 | 0.02 | bal. | 13 | 48 | |
| | 8 | 0.142 | 0.15 | 0.33 | 0.04 | bal. | 4 | 30 | |
| | 9 | 0.158 | 0.14 | 0.34 | 0.03 | bal. | 13 | 49 | |
| | 10 | 0.163 | 0.15 | 0.37 | 0.03 | bal. | 7 | 31 | |
| | 11 | 0.151 | 0.11 | 0.32 | 0.02 | bal. | 5 | 31 | |
| | 12 | 0.150 | 0.15 | 0.37 | 0.03 | bal. | 6 | 128 | |
| | 13 | 0.137 | 0.14 | 0.29 | 0.02 | bal. | 6 | 38 | |
| | 14 | 0.138 | 0.14 | 0.44 | 0.03 | bal. | 4 | 130 | |
| | 15 | 0.152 | 0.15 | 0.37 | 0.03 | bal. | 12 | 55 | |
| | 16 | 0.154 | 0.13 | 0.35 | 0.03 | bal. | 7 | 41 | |
| | 17 | 0.157 | 0.14 | 0.38 | 0.04 | bal. | 11 | 53 | |
| | 18 | 0.143 | 0.15 | 0.36 | 0.03 | bal. | No data | | Hot work crack |
| | 19 | —* | 0.15 | 0.22 | 0.03 | bal. | 7 | 48 | |
| | 20 | 0.306* | 0.15 | 0.52 | 0.04 | bal. | 9 | 63 | |
| | 21 | 0.143 | —* | 0.22 | 0.03 | bal. | 10 | 50 | |
| | 22 | 0.142 | 0.32* | 0.55 | 0.03 | bal. | 19 | 82 | |
| | 23 | 0.147 | 0.15 | 0.36 | —* | bal. | 8 | 40 | |
| | 24 | 0.150 | 0.15 | 0.36 | 0.06* | bal. | No data | | Hot work crack |

TABLE 3

| | | Cr mass % | Fe mass % | Ti mass % | Al mass % | Nb + Ta mass % | B mass % | Zr mass % | Mg mass % | Mn mass % | Cu mass % | Mo + ½W mass % | Cu + (Mo + ½W) + B + Zr mass % | C mass % | Ni mass % | Elongation % | Rupture time hrs | Note |
|---|---|---|---|---|---|---|---|---|---|---|---|---|---|---|---|---|---|---|
| Ni-based | 1 | 16.8 | 9.0 | 2.7 | 0.90 | 1.2 | — | — | — | 0.08 | 0.30 | — | 0.30 | 0.05 | | 16 | 63 | |
| Alloys of | 2 | 14.2 | 5.0 | 2.3 | 0.50 | 0.7 | — | — | — | 0.11 | 0.10 | — | 0.10 | 0.03 | | 14 | 52 | |
| conven- | 3 | 16.4 | 9.0 | 2.5 | 1.50 | 1.1 | — | — | — | 0.13 | 0.30 | — | 0.30 | 0.05 | | 9 | 53 | |
| tional | 4 | 14.8 | 5.0 | 2.1 | 0.90 | 0.7 | — | — | — | 0.09 | 0.10 | — | 0.10 | 0.03 | | 12 | 49 | |
| exam- | 5 | 15.3 | 7.5 | 2.6 | 1.40 | 1.2 | 0.004 | 0.04 | 0.01 | 0.08 | — | 2.5 | 2.54 | 0.05 | | 13 | 54 | |
| ples | 6 | 15.4 | 7.2 | 3.3 | 1.10 | 1.3 | 0.005 | 0.03 | 0.02 | 0.11 | — | 2.3 | 2.34 | 0.05 | | 10 | 48 | |

The results in Tables 1 to 3 show that in the creep tests, the Ni-based alloys of the examples of the present invention had an elongation of at least 12%, and even the shortest rupture times were 119 and 102 hours (see the Ni-based alloys of examples 28 and 29 of the present invention), i.e., the high-temperature creep characteristics largely improve.

In contrast, the Ni-based alloys of the comparative examples having the compositions falling outside the ranges of the present invention had short creep rupture times as a whole, and also had small elongations, i.e., were inferior to the Ni-based alloys of the present invention in creep characteristics. The Ni-based alloys of comparative examples 12 and 14 had rupture times of 128 and 130 hours, respectively, i.e., had relatively long rupture times, but their rupture elongations were 6% and 4%, respectively. Since these values do not satisfy the favorable elongation range of 10% to 30% of the present invention, these Ni-based alloys are inadequate for a gas turbine member.

Also, some conventional Ni-based alloys having the compositions falling outside the ranges of the present invention had relatively large elongations, but the rupture times were too short (even the longest rupture time was 63 hours in the Ni-based alloy of conventional example 1). That is, the Ni-based alloys of the conventional examples were obviously inferior in creep characteristics.

INDUSTRIAL APPLICABILITY

As described above, the Ni-based alloy of the present invention has excellent creep characteristics under high-temperature conditions, and hence can suitably be used as gas turbine members such as a turbine blade and turbine nozzle. In addition, it is possible to make these members thin, and raise the gas turbine inlet temperature. Therefore, this Ni-based alloy is expected to further improve the power generation efficiency of the gas turbine.

The invention claimed is:

1. An Ni-based alloy having a composition consisting of, by mass %, Cr: 14.0% to 17.0%, Fe: 5.0% to 9.0%, Ti: 2.2% to 2.8%, Al: 0.40% to 1.00%, a total amount of Nb+Ta: 0.7% to 1.2%, B: 0.001% to 0.010%, Zr: 0.01% to 0.15%, Mg: 0.001% to 0.050%, Mn: 0.01% to 0.20%, Cu: 0.005% to 0.300%, Mo: 0.01% to 0.30%, C: 0.01% to 0.05%, and the balance of Ni with inevitable impurities.

2. The Ni-based alloy according to claim 1, wherein a total content of B, Zr, Cu, and Mo is from 0.18% to 0.51%.

3. The Ni-based alloy according to claim 1, wherein the content of Cr is not less than 14.0% and less than 15.0%.

4. The Ni-based alloy according to claim 1, wherein in a creep test under conditions of a test temperature of 750° C. and a test load of 330 MPa, the Ni-based alloy has a creep rupture life of at least 120 hours and an elongation of at least 16%.

5. A gas turbine member, comprising the Ni-based alloy according to claim 1.

* * * * *